United States Patent [19]

Tamura et al.

[11] Patent Number: 4,584,331
[45] Date of Patent: Apr. 22, 1986

[54] POLYPHENYLENE ETHER RESIN COMPOSITION

[75] Inventors: Yutaka Tamura, Ibaraki; Ryohei Tanaka, Mie, both of Japan

[73] Assignee: Mitsubishi Petrochemical Co., Ltd., Tokyo, Japan

[21] Appl. No.: 545,156

[22] Filed: Oct. 25, 1983

[30] Foreign Application Priority Data

Jan. 28, 1983 [JP] Japan .................... 58-12417

[51] Int. Cl.⁴ .............................. C08K 5/52
[52] U.S. Cl. .................................... 529/119
[58] Field of Search .............. 525/68, 132; 524/117, 524/127, 119; 260/927 R, 936

[56] References Cited

U.S. PATENT DOCUMENTS

| | | | |
|---|---|---|---|
| 3,293,327 | 12/1966 | Hechenbleikner et al. | 524/119 |
| 3,873,498 | 3/1975 | Brunetti | 524/119 |
| 3,944,633 | 3/1976 | Gresham | 260/927 R |
| 3,981,841 | 9/1976 | Abolins et al. | 524/504 |
| 4,101,503 | 7/1978 | Cooper et al. | 525/68 |
| 4,341,694 | 7/1982 | Halpern | 524/119 |

Primary Examiner—John Kight
Assistant Examiner—Kriellion Morgan
Attorney, Agent, or Firm—Oblon, Fisher, Spivak, McClelland & Maier

[57] ABSTRACT

A composition comprising a polyphenylene ether or a composition of polyphenylene ether and other polymeric substances, and a bicyclophosphoric ester compound is disclosed. The composition has an improved flame-retardance without deteriorating the inherent heat resistance of the polyphenylene ether or a composition containing the same.

8 Claims, 2 Drawing Figures

POLYPHENYLENE ETHER RESIN COMPOSITION

FIELD OF THE INVENTION

The present invention relates to a novel flame-retardant resin composition. More particularly, it relates to a flame-retardant resin composition which is superior in thermal properties and is composed of polyphenylene ether or a mixture thereof with other polymeric substance and a bicyclophosphoric ester compound.

BACKGROUND OF THE INVENTION

Polyphenylene ether engineering plastics are drawing attention because of their outstanding mechanical and thermal properties and self-extinguishing characteristics.

The flame-retardance of polyphenylene ether is not necessarily satisfactory. Moreover, polyphenylene ether has an extremely poor processability when used alone, and, in actual use, it is blended with styrene resin and other resins for the improvement of processability. (For blending with styrene resin, see U.S. Pat. No. 3,383,435.) This blending impairs the self-extinguishing properties of polyphenylene ether and the blended polyphenylene ether is more combustible than the straight polyphenylene ether. Thus, there is a demand for the improvement of polyphenylene ether in flame-retardance.

In order to overcome the above-mentioned drawback, polyphenylene ether is incorporated with an aromatic phosphate compound such as triphenyl phosphate as a flame retardant. Triphenyl phosphate imparts flame retardance, but, at the same time, it lowers the heat distortion temperature because it also works as a plasticizer. Therefore, at present there are no satisfactory methods for making polyphenylene ether compositions flame-retardant.

As a result of research on flame-retardance of polyphenylene ether, it has been found that polyphenylene ether can be made flame-retardant, without sacrificing its thermal properties, by adding thereto a bicyclophosphoric ester compound.

SUMMARY OF THE INVENTION

Accordingly, an object of this invention is to provide a flame-retardant polyphenylene ether resin composition.

Another object of this invention is to provide a flame-retardant polyphenylene ether resin composition which retains the heat resistance and processability of polyphenylene ether.

Further another object of this invention is to provide a polyphenylene ether resin composition composed of polyphenylene ether or a mixture thereof with a polymeric substance and a bicyclophosphoric ester compound.

The polyphenylene ether resin composition of this invention comprises:

(a) 100 parts by weight of a polyphenylene ether, or a resin composition of polyphenylene ether and a polymeric substance, and (b) 0.1 to 20 parts by weight of a bicyclophosphoric ester compound represented by the formula:

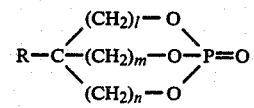

wherein $l$ is an integer of 0 to 2, m and n each is an integer of 1 to 3, and R is hydrogen or $C_1$–$C_{19}$ alkyl or a derivative thereof.

The polyphenylene ether resin composition of this invention exhibit flame-retardancy, and yet, unlike similar conventional resins, the thermal properties of polyphenylene ether are only minimally impaired by the addition of the flame-retardant.

DETAILED DESCRIPTION OF THE INVENTION

Figure 1:
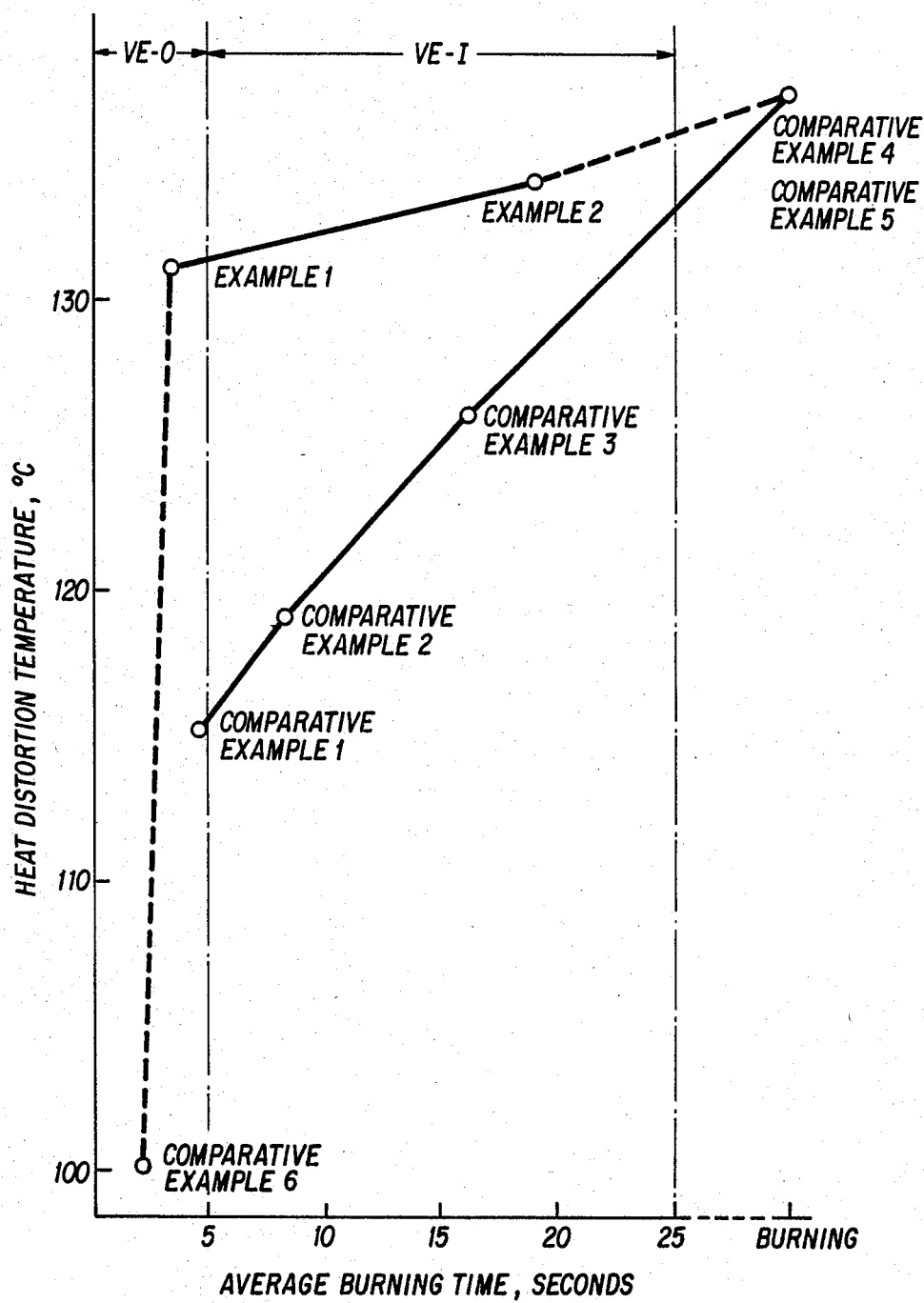
FIGS. 1 and 2 are the graphs showing the relationship between the heat distortion temperature and the average combustion time in the burning test according to UL Standards, Subject 94, in the resin compositions obtained in the examples and comparative examples.

The polyphenylene ether used in this invention is disclosed in U.S. Pat. Nos. 3,306,874, 3,306,875, 3,257,357, and 3,257,358, and other various literature reference.

The preferred polyphenylene ether is a polymer having the repeating units represented by the formula.

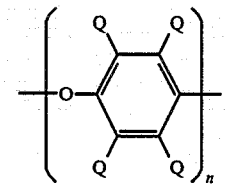

wherein the oxygen atom in one unit connects to the benzene nucleus of the adjoining unit; n is a positive integer of 50 or over; and Q is a monovalent substituent selected from the group consisting of a hydrogen atom, a halogen atom, a hydrocarbon group having no tert-$\alpha$-carbon atom, a halogenated hydrocarbon group having at least two carbon atoms between the halogen atom and the phenyl nucleus, a hydrocarbon oxy group, and a halogenated hydrocarbon oxy group having at least two carbon atoms between the halogen atom and the phenyl nucleus.

Typical examples of polyphenylene ether include poly(2,6-dilauryl-1,4-phenylene)ether, poly(2,6-diphenyl-1,4-phenylene)ether, poly(2,6-dimethoxy-1,4-phenylene)ether, poly(2,6-diethoxy-1,4-phenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-benzyl-1,4-phenylene)ether, poly(2-ethoxy-1,4-phenylene)ether, poly(2-chloro-1,4-phenylene)ether, and poly(2,5-dibromo-1,4-phenylene)ether.

Examples of polyphenylene ether further include a copolymer of 2,6-dimethylphenol and 2,3,6-trimethylphenol, a copolymer of 2,6-dimethylphenol and 2,3,5,6-tetramethylphenol, and a copolymer of 2,6-diethylphenol and 2,3,6-trimethylphenol.

The polyphenylene ether used in this invention also includes modified polyphenylene ether in which the polyphenylene ether defined by the above-mentioned formula is grafted with a styrenic monomer such as styrene, p-methylstyrene, and α-methylstyrene.

The examples of the polyphenylene ether corresponding to the above-mentioned formula are found in the specifications of the above-mentioned U.S. Patents.

The group of polyphenylene ethers preferred in this invention includes polyphenylene ether of the above-mentioned formula which has two alkyl substituents at the ortho positions with respect to the ether oxygen atom. In other words, each Q at the ortho position is alkyl, preferably $C_1$–$C_4$ alkyl. Typical examples of this group include poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, and poly(2-ethyl-6-propyl-1,4-phenylene)ether.

The most preferred polyphenylene ether resin in this invention is poly(2,6-dimethyl-1,4-phenylene)ether.

The above-mentioned polyphenylene ether may be incorporated with a variety of polymeric substances.

To improve moldability, the polyphenylene ether may be incorporated with a styrene resin. Examples of such styrene resin include homopolymer of styrene such as polystyrene and poly-α-methylstyrene; high-impact polystyrene modified with butadiene rubber, styrene-butadiene copolymer, ethylene-propylene copolymer, or ethylene-propylene-diene terpolymer; and styrene-butadiene copolymer, styrene-maleic anhydride copolymer, styrene-acrylonitrile copolymer, styrene-acrylonitrile-butadiene copolymer, and styrene-methyl methacrylate copolymer.

To improve impact resistance, the polyphenylene ether may further be incorporated with the polymeric substances such as natural rubber, polyisoprene, polybutadiene, styrene-butadiene copolymer, ethylene-propylene copolymer and ethylene-propylene-nonconjugated diene copolymer.

Moreover, the polyphenylene ether may be incorporated with a thermoplastic resin such as polyethylene, ethylene-vinyl acetate copolymer, polypropylene, polyamide, polycarbonate, polyethylene terephthalate, and styrene-grafted polyolefin.

The polyphenylene ether may also be incorporated with a reactive polymer produced by introducing polar groups into the above-mentioned elastomeric polymers or thermoplastic resins.

The reactive polymer can be produced by grafting the above-mentioned polymer with an unsaturated organic acid or an anhydride thereof (e.g., acrylic acid, methacrylic acid, maleic acid, itaconic acid, and anhydride thereof) or an unsaturated silane compound (e.g., vinyltrimethoxysilane, vinyltriethoxysilane, vinyltriacetoxysilane, γ-methacryloxypropyltrimethoxysilane, and propenyltrimethoxysilane), or by introducing metal ions into a part of the carboxyl group on the graft chain of the graft-modified polymer.

The reactive polymer can also be produced by block polymerization or random polymerization of ethylene with polar vinyl monomer (e.g., acrylic acid and ester thereof) or vinyl silane.

In the case where a reactive polymer is used, it is desirable to add an inorganic filler. When a reactive polymer and an inorganic filler are used in combination, the reactive polymer is dispersed in the matrix of polyphenylene ether or a composition of polyphenylene ether and styrene resin, and the inorganic filler is selectively filled in the reactive polymer. This unique structure provides outstanding mechanical strength.

The inorganic filler includes titanium oxide, zinc oxide, talc, clay, calcium carbonate, and silica which are commonly used for synthetic resins.

The inorganic filler should preferably have an average particle diameter of 0.05 to 1.0 μm, and it should be added in an amount of 0.5 to 60 wt%, preferably 1 to 45 wt%, based on the resulting composition.

Other polymers that can be used include polyphenylene ether-grafted polyolefin or styrene resin-grafted polyolefin.

The polyphenylene ether-grafted polyolefin can be produced by grafting glycidylated polyphenylene ether, which is obtained by reacting polyphenylene ether with epichlorohydrin, onto a polyolefin having carboxyl group or acid anhydride on the main chain or side chain, such as ethylene-acrylic acid copolymer, ethylene-methacrylic acid copolymer, maleic anhydride-modified polypropylene, maleic anhydride-modified polyethylene, and maleic anhydride-modified ethylene-vinyl acetate copolymer.

The polyphenylene ether-grafted polyolefin can also be produced by grafting polyphenylene ether to a polyolefin having a glycidyl group on the side chain such as ethylene-glycidyl methacrylate copolymer and ethylene-vinyl acetate-glycidyl methacrylate copolymer.

The polystyrene-grafted polyolefin can be produced by grafting a polyolefin having a glycidyl group on the side chain (e.g., ethylene-glycidyl methacrylate copolymer and ethylene-vinyl acetate-glycidyl methacrylate copolymer) to a styrene copolymer having a carboxyl group or cyclic acid anhydride on the main chain or side chain (e.g., styrene-maleic anhydride copolymer, styrene-citraconic acid anhydride copolymer, styrene-itaconic anhydride copolymer, styrene-asconit acid anhydride copolymer, styrene-acrylic acid copolymer, and styrene-methacrylic acid copolymer).

The grafted polyolefin can be added after graft polymerization; but in the case where a polyolefin containing a glycidyl group is used, the grafting reaction can be accomplished by mixing the polyolefin with polyphenylene ether or styrene resin having the group of carboxylic acid or anhydride thereof, at a high temperature of 150° C. or more.

The mixing at a high temperature is preferred from an economical point of view because the ingredients used are mixed uniformly and the polyphenylene ether-grafted polyolefin and/or polystyrene-grafted polyolefin can be produced all at once.

The above-mentioned polymeric substance should be added in an amount of 0 to 10,000 parts by weight, preferably 1 to 1,000 parts by weight, more preferably 25 to 400 parts by weight per 100 parts by weight of polyphenylene ether.

The bicyclophosphoric ester compound blended with the polyphenylene ether in this invention is represented by the formula

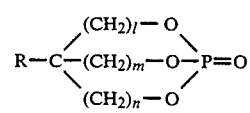

wherein l is an integer of 0 to 2, m and n each is an integer of 1 to 3, and R is hydrogen or $C_1$–$C_{19}$ alkyl or a derivative thereof. This compound is described in, for example, "Organic Phosphorus Compounds", Vol. 6 (published by Wiley-Interscience, a Division of John Wiley & Sons, Inc.) and other publications.

Examples of bicyclophosphoric ester compounds include 2,6,7-trioxa-1-phosphobicyclo[2,2,2]octane-1-oxide, 2,6,7-trioxa-1-phosphobicyclo[2,2,2]octane-4-methyl-1-oxide, 2,6,7-trioxa-1-phosphobicyclo[2,2,2]octane-4-ethyl-1-oxide, 2,6,7-trioxa-1-phosphobicyclo[2,2,2]octane-4-hexyl-1-oxide, 2,6,7-trioxa-1-phosphobicyclo[2,2,2]octane-4-hexadecyl-1-oxide, 2,6,7-trioxa-1-phosphobicyclo[2,2,2]octane-4-nitro-1-oxide, 2,6,7-trioxa-1-phosphobicyclo[2,2,2]octane-4-amino-1-oxide, 2,6,7-trioxa-1-phosphobicyclo[2,2,2]octane-4-hydroxymethyl-1-oxide, 2,8,9-trioxa-1-phosphobicyclo[2,2,2]nonane-5-methyl-1-oxide, and 2,6,7-trioxa-1-phosphobicyclo[2,2,2]heptane-4-methyl-1-oxide.

Examples of bicyclophosphoric ester compounds in which R is a derivative of alkyl group include the compounds represented by the formula

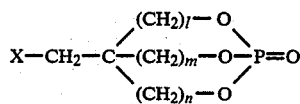

wherein l is an integer of 0 to 2, m and n each is an integer of 1 to 3, and X is a carboxylic acid residue, phosphoric acid residue, or alkoxy group.

Examples of such compounds include 2,6,7-trioxa-1-phosphobicyclo[2,2,2]octane-4-acetoxymethyl-1-oxide, 2,6,7-trioxa-1-phosphobicyclo[2,2,2]octane-4-benzoyloxymethyl-1-oxide, 2,6,7-trioxa-1-phosphobicyclo[2,2,2]octane-4-diphenoxyphosphinyloxymethyl-1-oxide, 2,6,7-trioxa-1-phosphobicyclo[2,2,2]octane-4-methoxymethyl-1-oxide, and 2,6,7-trioxa-1-phosphobicyclo[2,2,2]octane-4-ethoxymethyl-1-oxide.

The bicyclophosphoric ester compound is added in an amount of 0.1 to 20 parts by weight, preferably 1 to 10 parts by weight, per 100 parts by weight of polyphenylene ether or a composition of polyphenylene ether and polymeric substance. If the amount added is less than 0.1 part by weight, the flame-retardance effect is not produced, and if it is more than 20 parts by weight, the physical properties of the resulting composition is adversely affected.

The flame-retardant polyphenylene ether resin composition of this invention can be produced by a blending method conventionally used for blending plasticizers, stabilizers, colorants, etc. with an extruder or plast-mill. In particular, the intended flame-retardant polyphenylene ether resin composition can be produced by extruding with a 25 mm extruder at a cylinder temperature of 240° to 330° C. and a screw speed of 20 to 40 rpm, or by melt-mixing for 5 to 15 minutes with a plast-mill at a cell temperature of 240° to 330° C. and a screw speed of 20 to 40 rpm.

The present invention will now be described in greater detail by reference to the following examples and comparative examples but is not limited thereto.

EXAMPLE 1

Production of composition:

A flame-retardant polyphenylene ether resin composition was prepared by mixing 50 parts by weight of poly(2,6-dimethyl-1,4-phenylene)ether having an intrinsic viscosity of 0.50 dl/g (measured in chloroform at 25° C.), 50 parts by weight of high-impact polystyrene (475D, a product of Asahi Dow), and 5 parts by weight of 2,6,7-trioxa-1-phosphobicyclo[2,2,2]octane-4-ethyl-1-oxide. Mixing was accomplished for 10 minutes at 250° C. using a plast-mill running at a screw speed of 40 rpm.

The flame retardance and heat distortion temperature of the resulting polyphenylene ether resin composition were measured according to the following methods. The results are shown in Table 1 and FIG. 1.

Burning test:

The flame retardance of the polyphenylene ether resin composition of this invention was evaluated according to the UL Standards, Subject 94.

A specimen, 6 inch long, ½ inch wide, and 1/16 inch thick, is suspended vertically by holding the top in a room where there is no air movement. The flame of a Bunsen burner so adjusted as to form a ¾ inch long blue flame is applied to the lower end of the specimen. Ten seconds later, the burner is moved away. The duration of burning of the specimen is recorded (first combustion time).

Immediately after the flame on the specimen has gone out, the flame of a Bunsen burner is applied to the lower end of the specimen again for 10 seconds in the same manner as above. The duration of burning of the specimen is again recorded (second combustion time).

Concurrently, a piece of cotton is placed one foot under the specimen and whether or not the cotton catches fire when the burning resin drops is observed.

The above-mentioned tests are repeated for five specimens. The specimen is rated as 94VE-I if the maximum burning time is less than 30 seconds, the average burning time is less than 25 seconds, and none of the specimens ignite the cotton. The specimen is rated as 94VE-II if at least one of the specimens ignites the cotton. The specimen is rated as 94VE-O if the maximum burning time is less than 10 seconds, the average burning time is less than 5 seconds, and none of the specimens ignite the cotton. The specimen is rated as 94HB if the maximum burning time is more than 30 seconds or the average burning time is more than 25 seconds. The order of flame-retardance is 94VE-O, 94VE-I, 94VE-II, and 94HB.

Heat distortion temperature:

Measured as follows according to ASTM D-648.

A specimen, 126 mm long, 12.6 mm wide, and 6.3 mm thick, is heated at a rate of 2° C. per minute under a flexural stress of 18.6 kg/cm². The temperature at which the deflection reaches 0.254 mm is the heat distortion temperature.

EXAMPLE 2

The same experiment as in Example 1 was carried out for a flame-retardant polyphenylene ether resin composition prepared in the mixing ratio as shown in Table 1. The results are shown in Table 1 and FIG. 1.

COMPARATIVE EXAMPLES 1 TO 3

The same experiment as in Example 1 was carried out for flame-retardant polyphenylene ether resin compositions in which triphenyl phosphate was used as a flame-retardant. The results are shown in Table 1 and FIG. 1.

COMPARATIVE EXAMPLE 4

The same experiment as in Example 1 was carried out for a polyphenylene ether resin compositions in which no flame-retardant was added. The results are shown in Table 1 and FIG. 1.

COMPARATIVE EXAMPLES 5 AND 6

The same experiment as in Example 1 was carried out for flame-retardant polyphenylene ether resin compositions prepared in the mixing ratio as shown in Table 1. The results are shown in Table 1 and FIG. 1.

TABLE 1

|  | Examples | | Comparative Examples | | | | | |
|---|---|---|---|---|---|---|---|---|
|  | 1 | 2 | 1 | 2 | 3 | 4 | 5 | 6 |
| Component of Resin Composition (parts by weight) | | | | | | | | |
| Polyphenylene ether resin | 50 | 50 | 50 | 50 | 50 | 50 | 50 | 50 |
| High-impact polystyrene | 50 | 50 | 50 | 50 | 50 | 50 | 50 | 50 |
| Flame retardant | | | | | | | | |
| Bicyclophosphoric ester compound | 5 | 3 | — | — | — | — | 0.05 | 25 |
| Triphenyl phosphate | — | — | 7 | 5 | 3 | — | — | — |
| Burning test (rating according to UL-94) | 94VE-O | 94VE-I | 94VE-O | 94VE-I | 94VE-I | Burnt | Burnt | 94VE-O |
| Heat distortion temperature (°C.) | 131 | 134 | 115 | 119 | 126 | 137 | 137 | 100 |

EXAMPLE 3

The same experiment as in Example 1 was carried out for a flame-retardant polyphenylene ether resin composition prepared in the mixing ratio as shown in Table 2, in which the high-impact polystyrene was replaced by acrylonitrile-butadiene-styrene copolymer (JSK-15, a product of Japan Synthetic Rubber Co., Ltd.). The results are shown in Table 2.

EXAMPLES 4 TO 9

The same experiment as in Example 1 was carried out for flame-retardant polyphenylene ether resin compositions in which the 2,6,7-trioxa-1-phosphobicyclo[2,2,2]octane-4-ethyl-1-oxide was replaced by a variety of bicyclophosphoric ester compounds as shown in Table 2. The results are shown in Table 2.

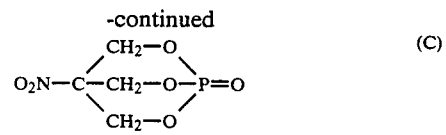

TABLE 2

|  | Examples | | | | | | | Comparative Example 1 |
|---|---|---|---|---|---|---|---|---|
|  | 3 | 4 | 5 | 6 | 7 | 8 | 9 |  |
| Components of resin composition (parts by weight) | | | | | | | | |
| Polyphenylene ether resin | 50 | 50 | 50 | 50 | 50 | 50 | 50 | 50 |
| Polymeric substance | | | | | | | | |
| High-impact polystyrene | — | 50 | 50 | 50 | 50 | 50 | 50 | 50 |
| ABS resin | 50 | — | — | — | — | — | — | — |
| Flame retardant | | | | | | | | |
| Bicyclophosphoric ester compound | 5 (A) | 5 (B) | 5 (C) | 5 (D) | 5 (E) | 5 (F) | 5 (G) | — |
| Triphenyl phosphate | — | — | — | — | — | — | — | 7 |
| Burning test (rating according to UL-94) | 94VE-O | 94VE-O | 94VE-O | 94VE-O | 94VE-O | 94VE-O | 94VE-O | 94VE-O |
| Heat distortion temperature (°C.) | 133 | 132 | 133 | 130 | 130 | 129 | 131 | 115 |

Structure of bicyclophosphoric ester compound

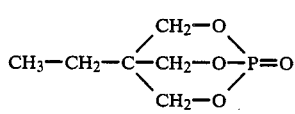
(A)

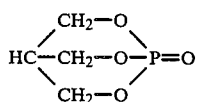
(B)

EXAMPLE 10

Figure 2:
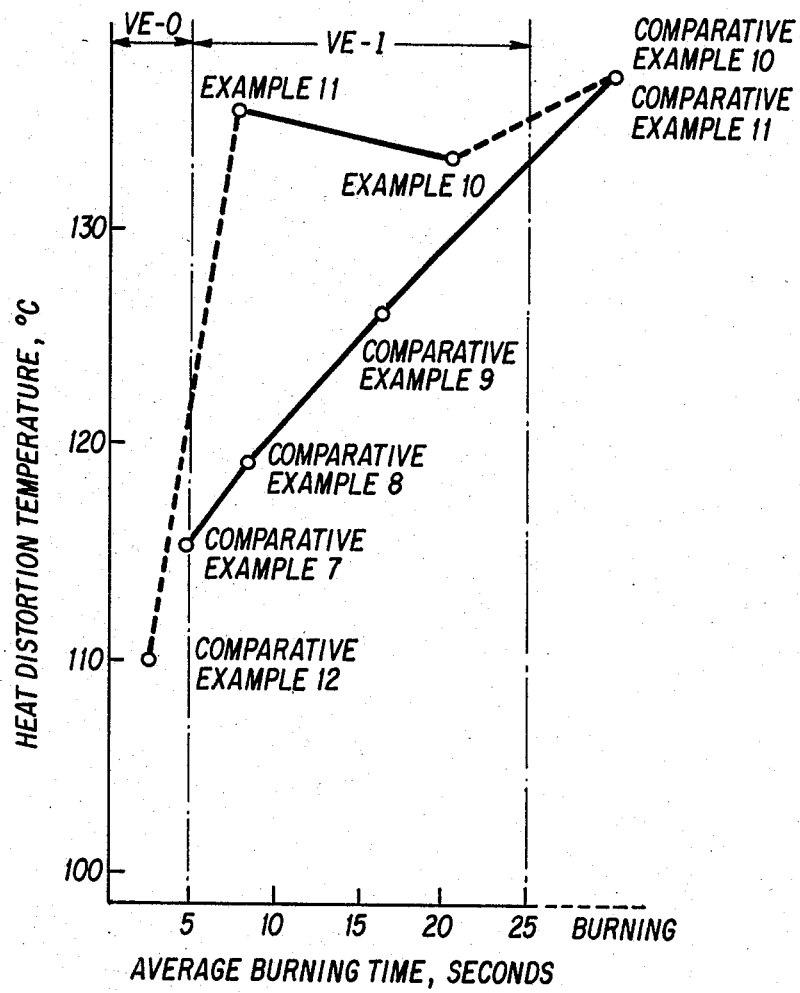

The same experiment as in Example 1 was carried out for a flame-retardant polyphenylene ether resin composition in which 5 parts by weight of 2,6,7-trioxa-1-phosphobicyclo[2,2,2]octane-4-benzoyloxymethyl-1-oxide was used. The results are shown in Table 3 and FIG. 2.

EXAMPLE 11

The same experiment as in Example 10 was carried out for a flame-retardant polyphenylene ether resin composition prepared in the mixing ratio as shown in Table 3. The results are shown in Table 3 and FIG. 2.

COMPARATIVE EXAMPLES 7 TO 9

The same experiments as in Example 10 were carried out for flame-retardant polyphenylene ether resin compositions prepared in the mixing ratio as shown in Table 3, in which triphenyl phosphate was used as the flame-retardant. The results are shown in Table 3 and FIG. 2.

EXAMPLES 13 TO 15

The same experiments as in Example 10 were carried out for flame-retardant polyphenylene ether resin compositions in which the 2,6,7-trioxa-1-phosphobicyclo[2,2,2]octane-4-benzoyloxymethyl-1-oxide was replaced by a variety of bicyclophosphoric ester compounds as shown in Table 4. The results are shown in Table 4.

TABLE 3

|  | Examples | | Comparative Examples | | | | | |
|---|---|---|---|---|---|---|---|---|
|  | 10 | 11 | 7 | 8 | 9 | 10 | 11 | 12 |
| Component of Resin Composition (parts by weight) | | | | | | | | |
| Polyphenylene ether resin | 50 | 50 | 50 | 50 | 50 | 50 | 50 | 50 |
| High-impact polystyrene | 50 | 50 | 50 | 50 | 50 | 50 | 50 | 50 |
| Flame retardant | | | | | | | | |
| Bicyclophosphoric ester compound | 5 | 10 | — | — | — | — | 0.05 | 25 |
| Triphenyl phosphate | — | — | 7 | 5 | 3 | — | — | — |
| Burning test (rating according to UL-94) | 94VE-I | 94VE-I | 94VE-O | 94VE-I | 94VE-I | Burnt | Burnt | 94VE-O |
| Heat distortion temperature (°C.) | 133 | 135 | 115 | 119 | 126 | 137 | 137 | 110 |

Structure of bicyclophosphoric ester compound:

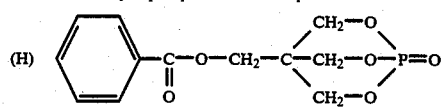

TABLE 4

|  | Examples | | | | Comparative |
|---|---|---|---|---|---|
|  | 12 | 13 | 14 | 15 | Example 8 |
| Components of resin composition (parts by weight) | | | | | |
| Polyphenylene ether resin | 50 | 50 | 50 | 50 | 50 |
| Polymeric substance | | | | | |
| High-impact polystyrene | — | 50 | 50 | 50 | 50 |
| ABS resin | 50 | — | — | — | — |
| Flame retardant | | | | | |
| Bicyclophosphoric ester compound | 5 (H) | 5 (I) | 5 (J) | 5 (K) | — |
| Triphenyl phosphate | — | — | — | — | 5 |
| Burning test (rating according to UL-94) | 94VE-I | 94VE-I | 94VE-I | 94VE-I | 94VE-I |
| Heat distortion temperature (°C.) | 134 | 133 | 134 | 135 | 119 |

COMPARATIVE EXAMPLE 10

The same experiment as in Example 1 was carried out for a flame-retardant polyphenylene ether resin composition in which no flame-retardant was added. The results are shown in Table 3 and FIG. 2.

COMPARATIVE EXAMPLES 11 AND 12

The same experiments as in Example 10 were carried out for flame-retardant polyphenylene ether resin compositions prepared in the mixing ratio as shown in Table 3. The results are shown in Table 3 and FIG. 2.

EXAMPLE 12

The same experiment as in Example 10 was carried out for a flame-retardant polyphenylene ether resin composition prepared in the mixing ratio as shown in Table 4, in which the high-impact polystyrene was replaced by acrylonitrile-butadiene-styrene copolymer (JSK-15, a product of Japan Synthetic Rubber Co., Ltd.). The results are shown in Table 4.

Structure of bicyclophosphoric ester compound:

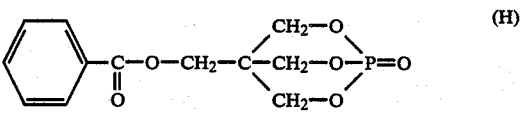

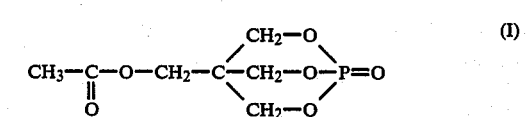

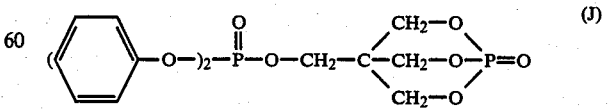

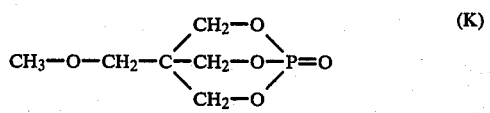

EXAMPLES 16 AND 17

Polyphenylene ether resin compositions were prepared by mixing the following components in the ratio as shown in Table 5 using a super-mixer and then the resulting compositions were melted at 280° C. and pelletized using a twin-screw extruder (PCM-45φ, made by Ikegai Iron Works, Ltd.).

Poly(2,6-dimethyl-1,4-phenylene)ether (made by Mitsubishi Petrochemical Co., Ltd., having an intrinsic viscosity of 0.47 as measured in chloroform at 30° C.);

Polystyrene (HF-77, a product of Mitsubishi Monsanto) Maleic anhydride-grafted ethylene-propylene copolymer (a product of Mitsubishi Petrochemical Co., Ltd., containing 1.5 wt% of maleic anhydride);

Styrene-butadiene copolymer (1502, a product of Japan Synthetic Rubber Co., Ltd.);

Precipitated calcium carbonate (having an average particle diameter of 0.5 μm); and 2,6,7-trioxa-1-phosphobicyclo[2,2,2]octane-4-hexyl-1-oxide.

The pellets were molded into prescribed test pieces using an injection molding machine, Model N-100, made by The Japan Steel Works, Ltd. The test pieces were subjected to burning test according to the UL standards, and the heat distortion temperature of the test pieces was measured. The results are shown in Table 5.

COMPARATIVE EXAMPLES 13 AND 14

Examples 16 and 17 were repeated except that the 2,6,7-trioxa-1-phosphobicyclo[2,2,2]octane-4-hexyl-1-oxide was replaced by triphenyl phosphate. The results are shown in Table 5.

TABLE 5

|  | Example | | Comparative Example | |
|---|---|---|---|---|
|  | 16 | 17 | 13 | 14 |
| Formulation (parts by weight) | | | | |
| Poly(2,6-dimethyl-1,4-phenylene) ether | 45 | 45 | 45 | 45 |
| Polystyrene | 45 | 45 | 45 | 45 |
| Maleic anhydride-grafted ethylenepropylene copolymer | 5 | 5 | 5 | 5 |
| Styrene-butadiene copolymer | 5 | 5 | 5 | 5 |
| Calcium carbonate | 5 | 5 | 5 | 5 |
| 2,6,7-trioxa-1-phosphobicyclo[2,2,2]octane-4-hexyl-1-oxide | 5 | 3 | — | — |
| Triphenyl phosphate | — | — | 8 | 5 |
| Measurements | | | | |
| Heat distortion temperature (°C.) | 112 | 115 | 93 | 98 |
| Burning test (UL-94) | 94VE-O | 94VE-I | 94VE-I | 94HB |

While the invention has been described in detail and with reference to specific embodiments thereof, it will be apparent to one skilled in the art that various changes and modifications can be made therein without departing from the spirit and scope thereof.

What is claimed is:

1. A polyphenylene ether resin composition comprising:
100 parts by weight of a polyphenylene ether resin of the formula:

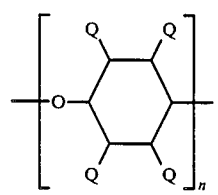

wherein n is a positive integer of 50 or over and where Q is a monovalent substituent selected from the group consisting of hydrogen, a halogen atom, a hydrocarbon group having no tert-α-carbon atom, a halogenated hydrocarbon group having at least two carbon atoms between the halogen atom and the benzene nucleus of formula (I), a hydrocarbon oxy group and a halogenated hydrocarbon oxy group having at least two carbon atoms between the halogen atom and the benzene nucleus of formula (I) and at least the Q in the 2 or 6 position in formula (I) is not hydrogen, up to 400 parts by weight of an additional polymeric substance, which is a resin or an elastomer and, per 100 parts of the total weight of polyphenylene ether resin and of any such additional resin or elastomer present in the composition, 1 to 20 parts by weight of a bicyclophosphoric ester compound represented by the formula

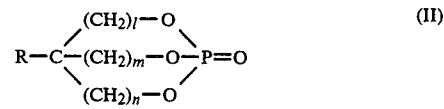

wherein l is an integer of 0 to 2, m and n each is an integer of 1 to 3, and R is hydrogen, $C_1$–$C_{19}$ alkyl, alkoxymethyl, or nitryl.

2. A polyphenylene ether resin composition as claimed in claim 1, wherein the resin composition comprises 100 parts by weight of the polyphenylene ether, and 1 to 400 parts by weight of polystyrene.

3. A polyphenylene ether resin composition as claimed in claim 1, wherein the resin composition comprises 100 parts by weight of the polyphenylene ether, and 1 to 400 parts by weight of rubber-modified polystyrene.

4. A polyphenylene ether resin composition claimed in claim 1, wherein the resin composition comprises 100 parts by weight of the polyphenylene ether and 1 to 400 parts by weight of polystyrene, polyphenylene ether-grafted polyolefin, and polystyrene-grafted polyolefin.

5. A polyphenylene ether resin composition as claimed in claim 1, wherein the resin composition comprises 100 parts by weight of the polyphenylene ether and 1 to 400 parts by weight of polystyrene and reactive polymer, said reactive polymer being dispersed in the matrix of the polyphenylene ether and the polystyrene and an inorganic filler being further dispersed in said dispersed phase.

6. A polyphenylene ether resin composition as claimed in claim 1, wherein the bicyclophosphoric ester is represented by the formula

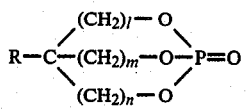

wherein l is an integer of 0 to 2, m and n each is an integer of 1 to 3, and R is hydrogen or $C_1$-$C_{19}$ alkyl.

7. A polyphenylene ether resin composition as claimed in claim 1, wherein the bicyclophosphoric ester is represented by the formula

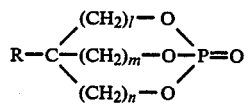

wherein l is an integer of 0 to 2, m and n each is an integer of 1 to 3, and R is X—$CH_2$— wherein X is an alkoxy group.

8. A polyphenylene ether resin composition as claimed in claim 1, wherein the bicylophosphoric ester is represented by the formula

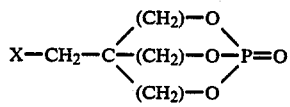

wherein X is an alkoxy group.

* * * * *